US009731318B2

(12) United States Patent
Yi

(10) Patent No.: US 9,731,318 B2
(45) Date of Patent: Aug. 15, 2017

(54) SAUCE GUN WITH REPLACEABLE PUSHING MECHANISM

(71) Applicant: Yongjian Yi, Jiangmen (CN)

(72) Inventor: Yongjian Yi, Jiangmen (CN)

( * ) Notice: Subject to any disclaimer, the term of this patent is extended or adjusted under 35 U.S.C. 154(b) by 0 days.

(21) Appl. No.: 14/995,854

(22) Filed: Jan. 14, 2016

(65) Prior Publication Data

US 2016/0288161 A1 Oct. 6, 2016

(30) Foreign Application Priority Data

Mar. 31, 2015 (CN) .......................... 2015 1 0151524

(51) Int. Cl.
*B67D 7/60* (2010.01)
*G01F 11/00* (2006.01)
*B05C 17/01* (2006.01)

(52) U.S. Cl.
CPC ................................ *B05C 17/0123* (2013.01)

(58) Field of Classification Search
CPC . B05C 17/013; B05C 17/012; B65D 83/0022; B65D 83/0033; F16N 3/12; G01F 11/026; G01F 11/00; Y10T 73/1553; Y10T 73/1598
USPC .......... 222/391, 325, 326, 386; 604/61, 208, 604/209; 401/66, 179
See application file for complete search history.

(56) References Cited

U.S. PATENT DOCUMENTS

| | | | | |
|---|---|---|---|---|
| 2,367,347 | A * | 1/1945 | Good | B05C 17/0123 222/391 |
| 2,889,085 | A * | 6/1959 | Collins | B05C 17/0123 222/391 |
| 3,290,953 | A * | 12/1966 | Ulm | B66F 1/06 74/141.5 |
| 4,330,070 | A * | 5/1982 | Doubleday | G01F 11/023 222/287 |
| 4,655,372 | A * | 4/1987 | Ross | G01F 11/026 192/111.1 |
| 5,197,635 | A * | 3/1993 | Chang | B05C 17/00553 222/137 |
| 5,400,925 | A * | 3/1995 | Simmen | B05C 17/00553 222/137 |
| 5,638,997 | A * | 6/1997 | Hawkins | A61B 17/8822 222/327 |
| 7,011,238 | B1 * | 3/2006 | Sung | B05C 17/0123 222/391 |
| 7,032,785 | B1 * | 4/2006 | Huang | B05C 17/0123 222/145.1 |

(Continued)

*Primary Examiner* — J. Casimer Jacyna
*Assistant Examiner* — Benjamin R Shaw
(74) *Attorney, Agent, or Firm* — Hauptman Ham, LLP

(57) ABSTRACT

The invention discloses a sauce gun with replaceable pushing mechanism, including a gun body, a push rod with row teeth, a fixed handle with a cavity, a trigger handle and a pushing mechanism, wherein the pushing mechanism includes a function case detachably installed in the cavity, the external wall of the function case is provided with a first sliding groove, the first sliding groove is internally provided with a first connecting piece driven by the trigger handle, and the function case is internally provided with a front push rod lock rotatably connected to the first connecting piece, a rear push rod lock hinged with the function case through a second connecting piece, and a flexible device driving the front push rod lock and the rear push rod lock to match with the row teeth respectively.

10 Claims, 10 Drawing Sheets

(56) References Cited

U.S. PATENT DOCUMENTS

2008/0047983 A1* 2/2008 Beckett .................. B05C 17/01
222/391

* cited by examiner

PRIOR ART

SAUCE GUN WITH REPLACEABLE PUSHING MECHANISM

FIELD OF THE INVENTION

The invention relates to a food appliance, particularly to a sauce gun with replaceable pushing mechanism.

BACKGROUND

Currently, a sauce gun sold on the market generally includes a gun body 1' with a through hole 11', wherein a push rod 2' with row teeth 21' is slidably provided through the through hole 11', a fixed handle 31' is installed at the top of the gun body 1', the fixed handle 31' is internally hinged with a trigger handle 32' through a first revolving shaft 41' and is internally hinged with a rear push rod lock 43' matched with the row teeth 21' through a second revolving shaft 42' respectively, one end of the trigger handle 32' close to the push rod 2' is hinged with a front push rod lock 45' matched with the row teeth 21' through a third revolving shaft 44', a rear torsional spring 461' and a front torsional spring 462' are installed on the second revolving shaft 42' and the third revolving shaft 44' respectively, both ends of the rear torsional spring 461' are pressed against the rear push rod lock 43' and the fixed handle 31' respectively, and both ends of the front torsional spring 462' are pressed against the front push rod lock 45' and the fixed handle 31' respectively. In use, when the trigger handle 32' is pulled, the front push rod lock 45' is driven to move the push rod 2' downward so as to squeeze out sauce; when the trigger handle 32' is loosened, the front push rod lock 45' resets under the action of the front torsional spring 462'. At this time, the push rod 2' is prevented from moving upward in the resetting process of the front push rod lock 45' since the rear push rod lock 43' is blocked on the row teeth 21' under the action of the rear torsional spring 461'. The sauce can be continuously squeezed out through pulling the trigger handle 32' over and over again in such a way. The sauce gun is simple in structure and easy to use, but it also has defects as follows: in order to facilitate to install the front push rod lock 45', the front torsional spring 462', the rear push rod lock 43' and the rear torsional spring 461' in the fixed handle 31', the left end and the right end of the fixed handle 31' are in an opening structure. The front torsional spring 462' and the first torsional spring 461' are pressed in use and are likely to break in the pressed portion over time; and the broken fragments are likely to fall into food from the fixed handle 31', which not only pollute the food, but also easily cause an accident since an eater does not see the fallen fragments and eats the food including the fragments by mistake. At the same time, the structure is out of service once the front torsional spring 462' or the rear torsional spring 461' is broken, and a new appliance needs to be purchased, so the service life is short.

In addition, according to the above-mentioned structure, the rotation of the trigger handle 32' is controlled by means of hands to control the down distance of the push rod 2'. Although the row teeth 21' is matched with the front push rod lock 45' and the rear push rod lock 43' to limit the down distance of the push rod 2' to some extent, different users' strength may be different and the same user's strength used at different time may also be different, which makes the extrusion amount of the sauce every time uncontrollable and non-adjustable.

SUMMARY

In order to overcome the shortages of the prior art, the invention provides a sauce gun with replaceable pushing mechanism, which can effectively assure the quality of food and has long service life.

The technical solutions adopted to solve the technical problems of the invention are as below:

A sauce gun with replaceable pushing mechanism, includes

- a gun body, wherein the upper end of the gun body is provided with a through hole;
- a push rod, wherein the push rod can be slidably provided through the through hole, and the push rod is provided with row teeth;
- a fixed handle, wherein the fixed handle is fixedly installed at the top of the gun body and internally provided with a cavity with openings at both ends;
- a trigger handle, wherein one end of the trigger handle extends into the cavity and then is hinged with the fixed handle; and
- a pushing mechanism, wherein the pushing mechanism comprises a function case detachably installed in the cavity, the trigger handle is installed out of the function case, the function case is provided with a push rod through hole facilitating the push rod to penetrate through corresponding to the through hole of the gun body, the external wall of the function case is provided with a first sliding groove, the first sliding groove is internally provided with a first connecting piece driven by the trigger handle, and the function case is internally provided with a front push rod lock rotatably connected to the first connecting piece, a rear push rod lock hinged with the function case through a second connecting piece, and a flexible device driving the front push rod lock and the rear push rod lock to match with the row teeth respectively.

As an improvement to the above-mentioned technical solution, one end of the function case far away from the trigger handle is provided with a case opening aligning with the opening of the cavity, the push rod blocks and seals the case opening and forms an enclosure space with the external wall of the function case, and the front push rod lock, the rear push rod lock and the flexible device are installed in the enclosure space.

As a further improvement to the above-mentioned technical solution, the external wall of the function case is provided with two internal recesses, the opening of each internal recess faces toward the opening of the cavity and is close to the trigger handle, and the fixed handle is provided with two limit parts located at different altitudes and matched with the two internal recesses respectively.

Further, the flexible device is formed integrally and includes a first sheathing portion and a second sheathing portion sheathed on the first connecting piece and the second connecting piece respectively, and an intermediate portion connected between the first sheathing portion and the second sheathing portion, the free end of the first sheathing portion is butted against the front push rod lock, and the free end of the second sheathing portion is butted against the rear push rod lock.

Further, the first sliding groove is a line groove, and the trigger handle is provided with a U-shaped groove matched with the first connecting piece.

Further, the first connecting piece is provided with a projection penetrating through the fixed handle, the fixed handle is provided with a second sliding groove for moving the first connecting piece in a position corresponding to the first sliding groove, one side of the second sliding groove is provided with a flow rate regulating device matched with the projection for regulating the sliding displacement of the first connecting piece on the second sliding groove, and the external wall of the fixed handle is provided with an access groove connected to the second sliding groove and facilitating to install the projection into the second sliding groove from the opening end of the cavity.

Further, the flow rate regulating device includes a revolving member rotatably connected to the fixed handle, and the revolving member is provided with limit grooves located at different depths and matched with the projection in the circumferential direction.

Further, the flow rate regulating device includes a sliding seat installed on the fixed handle and a gear shifting member slidably connected to the sliding seat, the side end of the gear shifting member is screwed with a fastener butted against the sliding seat or the fixed handle to fix the gear shifting member, one end of the gear shifting member close to the second sliding groove is provided with a step matched with the projection.

Further, the lower end of the push rod is detachably connected with a top tray.

Further, the push rod is a round rod.

The invention has the advantageous effects that: the function case is detachably installed in the cavity by providing the pushing mechanism with the function case in the invention, and the front push rod lock, the rear push rod lock and the flexible device are installed in the function case. When the flexible device is cracked on the expiry date of the service life, the fragments can be effectively prevented from falling into food from the fixed handle due to the blockage of the function case, avoiding food pollution, and avoiding causing an accident as people eat food including the fragments by mistake. At the same time, as the function case is detachable, the pushing mechanism can be directly replaced for continuous use after the flexible device is cracked. No new sauce gun needs to be purchased, so the use cost is low and the service life is long. In addition, the invention is further provided with a flow rate regulating device, the sliding displacement of the first connecting piece on the second sliding groove is controlled by fitting the flow rate regulating device with the projection of the first connecting member, so as to control the rotating angle of the trigger handle connected to the first connecting part and control the down displacement of the push rod pushed by the front push rod lock connected to the first connecting member. In this way, the flow rate of the sauce squeezed out every time is controllable and adjustable.

BRIEF DESCRIPTION OF THE DRAWINGS

The present invention will be further descried hereinafter with reference to the drawings and embodiments.

DETAILED DESCRIPTION OF THE EMBODIMENTS

Figure 1:
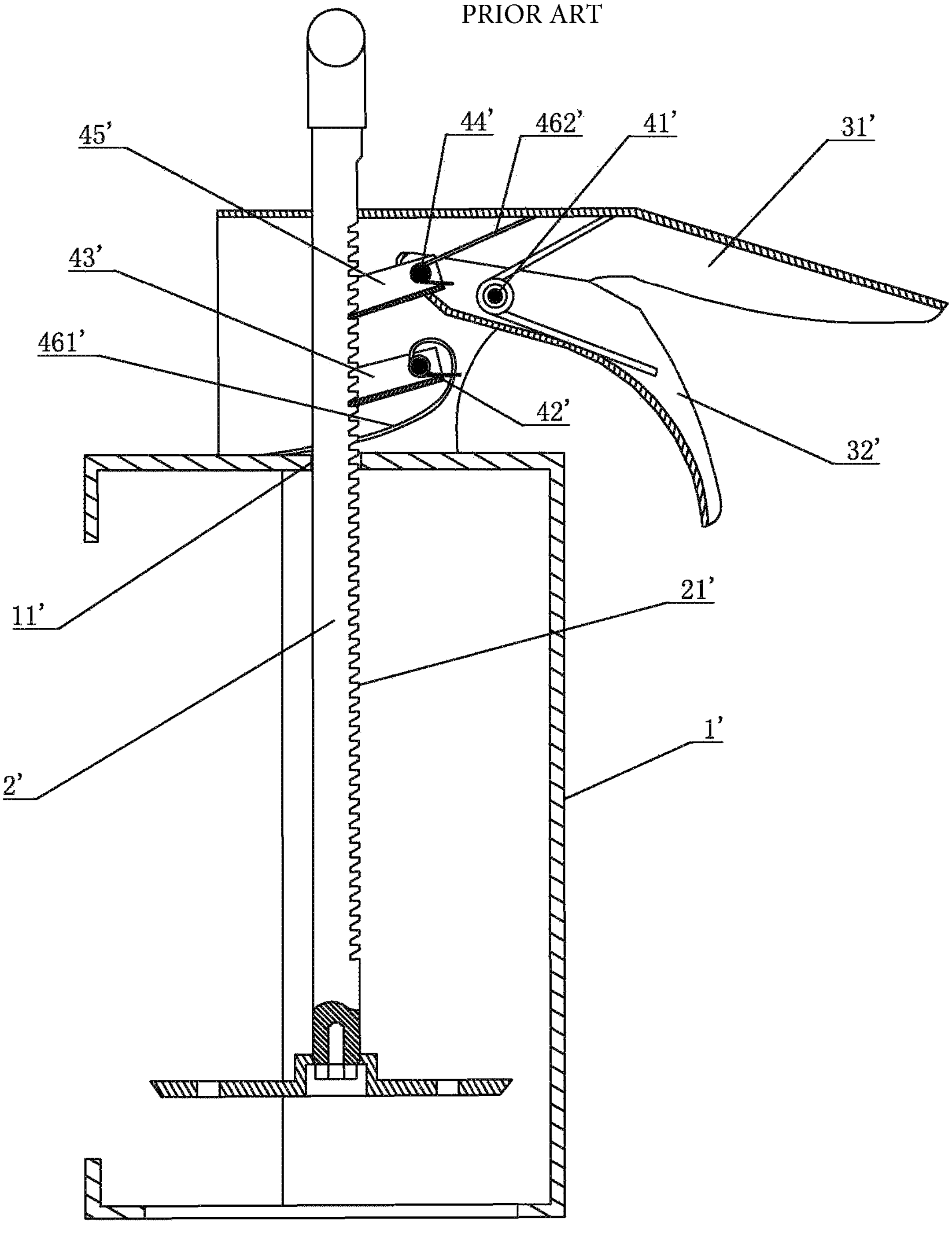
FIG. 1 is a schematic structural diagram of the prior art sauce gun.
Figure 2:
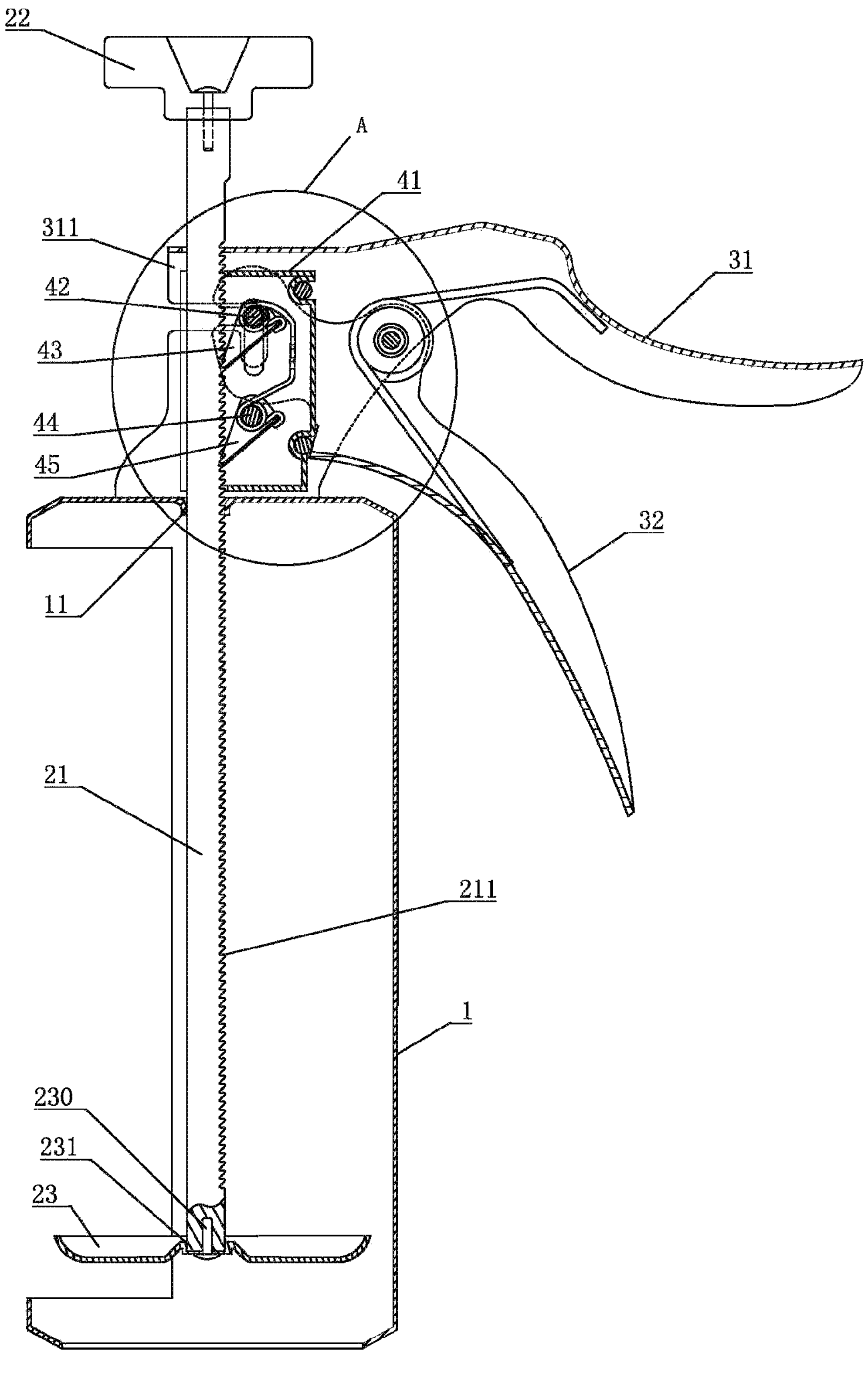
FIG. 2 is a schematic structural diagram of the invention.
Figure 3:
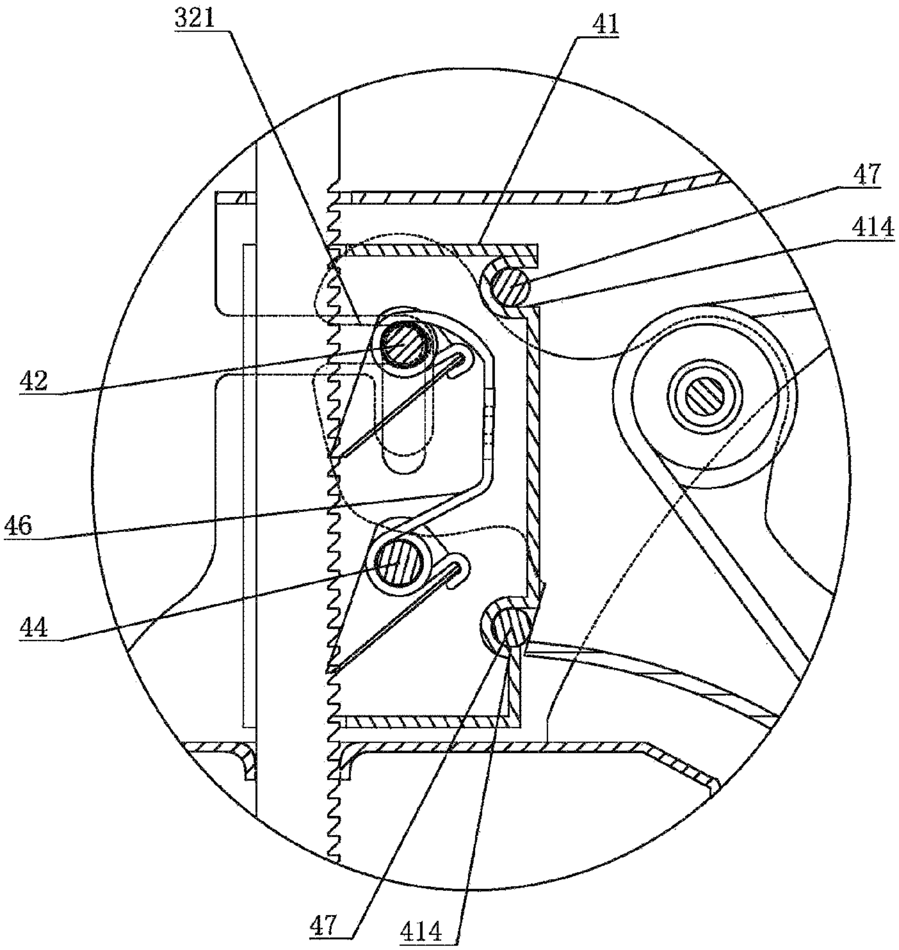
FIG. 3 is an enlarged view of portion A in FIG. 2.
Figure 4:
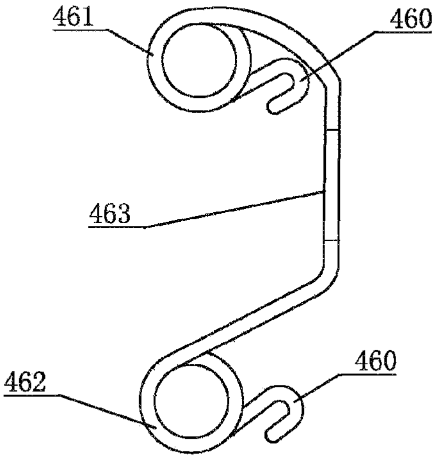
FIG. 4 is a front view of a flexible device in the invention.
Figure 5:
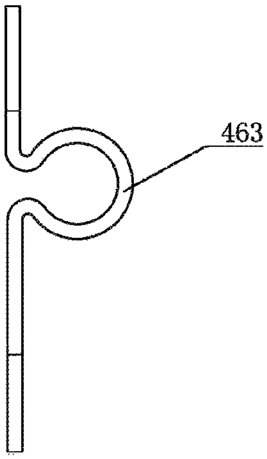
FIG. 5 is a side view of the flexible device in the invention.
Figure 6:
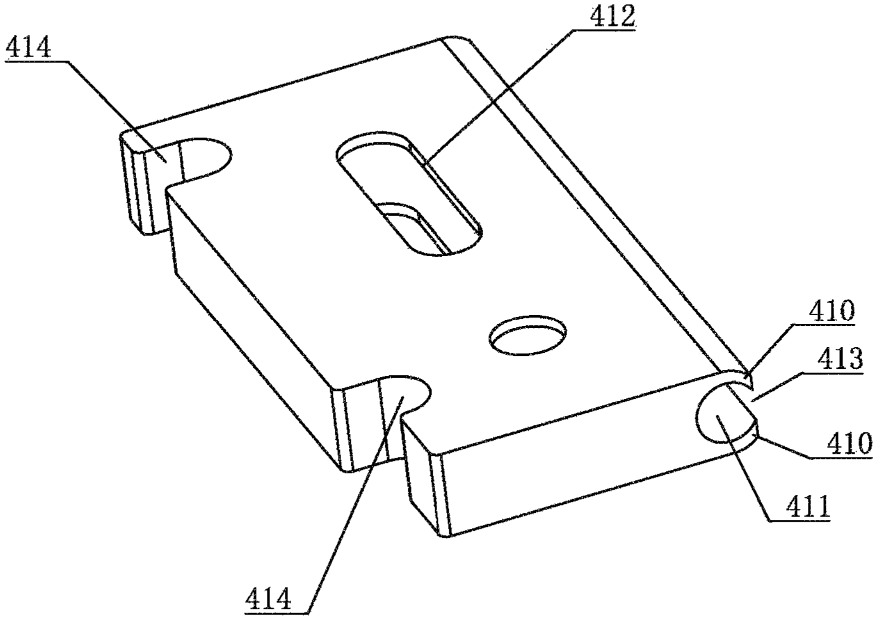
FIG. 6 is a schematic structural diagram of a function case in the invention.

Referring to FIG. 2 to FIG. 16, a sauce gun with replaceable pushing mechanism according to the invention includes a gun body 1, a push rod 21, a fixed handle 31, a trigger handle 32 and a pushing mechanism, wherein the upper end of the gun body is provided with a through hole 11; the push rod 21 is slidably provided through the through hole 11, and the push rod 21 is provided with row teeth 211; just one strip of row teeth 211 arranged on the push rod 21 is shown here in FIG. 2 to FIG. 6, but in practical application, the push rod 21 can also be provided with two strips of row teeth 211; preferably, the pitch of the two strips of row teeth 211 is different so as to meet the user's demands on different extrusion amounts of the sauce. In order to facilitate to manufacture, two strips of row teeth 211 are symmetrically arranged with respect to the center of the push rod 21; the fixed handle 31 is fixedly installed at the top of the gun body 1 and is internally provided with a cavity 311 with two opening ends; one end of the trigger handle 32 extends into the cavity 311 and then is hinged with the fixed handle 31; the pushing mechanism includes a function case 41 detachably installed in the cavity 311, the trigger handle 32 is installed out of the function case 41, the function case 41 is provided with a push rod through hole 411 facilitating the push rod 21 to penetrate through corresponding to the through hole 11 of the gun body 1, the external wall of the function case 41 is provided with a first sliding groove 412, the first sliding groove 412 is internally provided with a first connecting piece 42 driven by the trigger handle 32, and the function case 41 is internally provided with a front push rod lock 43 rotatably connected to the first connecting piece 42, a rear push rod lock 45 hinged with the function case 41 through a second connecting piece 44, and a flexible device 46 driving the front push rod lock 43 and the rear push rod lock 45 to match with the row teeth 211 respectively.

The function case 41 is detachably installed in the cavity by providing the pushing mechanism with the function case 41 in the invention, and the front push rod lock 43, the rear push rod lock 45 and the flexible device 46 are installed in the function case 41. When the flexible device 46 is cracked on the expiry date of the service life, the fragments can be effectively prevented from falling into food from the fixed handle 31 due to the blockage of the function case 41, avoiding food pollution, and avoiding causing an accident as people eat food including the fragments by mistake. At the same time, as the function case 41 is detachable, the pushing mechanism can be directly replaced for continuous use after the flexible device 46 is cracked. No new sauce gun needs to be purchased, so the use cost is low and the service life is long When the push rod 21 is dismounted, or the push rod 21 moving to the maximum stroke is pulled back to the minimum stroke, rotate the push rod 21 to enable the row teeth 211 to break away from the front push rod lock 43 and the rear push rod lock 45, thereby facilitating to push or pull the push rod 21. In the invention, in order to facilitate to rotate the push rod 21, the push rod 21 is a round rod; and in order to facilitate to hold the push rod 21, the upper end of the push rod 21 is provided with a handle 22.

Further, one end of the function case 41 far away from the trigger handle 32 is provided with a case opening 413 aligning with the opening of the cavity 311, the push rod 21 blocks and seals the case opening 413 and forms an enclosure space with the external wall of the function case 41, and the front push rod lock 43, the rear push rod lock 45 and the flexible device 46 are installed in the enclosure space. The case opening 413 is arranged so as to facilitate not only to add lubricant to the function case 41 for the user but also to pour out the powder generated in the function case 41 due to abrasion or the water permeated due to cleaning for the user, thereby ensuring the pushing mechanism is in a good working condition and prolonging the service life of the sauce gun. The case opening 413 is blocked by the push rod 21 and no other blocking part is needed, so that the structure is simplified and the weight of the sauce gun is reduced. Preferably, the case opening 413 penetrated through the push rod through hole 411, two ends of the case opening 413 extend to the centerdirection of the push rod 21 to form an encasing and clamping arm 410 adhered to the push rod 21 to prevent the push rod 21 from falling off. The structure is compact and the occupation space is small, which is beneficial to reducing the volume and weight of the sauce gun. At the same time, under the action of the flexible device 46, the push rod 12 is adhered to the encasing and clamping arm 410, which not only can seal the case opening 413, but also can guide the push rod 21 to move up and down, thereby preventing the long push rod 21 from deflect during the course of moving up and down.

In a general way, in order to facilitate to assemble the function case 41 in or disassemble the function case out of the cavity 311, the height of the cavity 311 shall be greater than the height of the function case 41. In order to prevent the function case 41 from waggling following the push rod in the process of moving down the push rod 21, the external wall of the function case 41 is provided with two internal recesses 414, the opening of each internal recess 414 faces toward the opening of the cavity 311 and is close to the trigger handle 32, and the fixed handle 31 is provided with two limit parts 47 located at different altitudes and matched with the two internal recesses 414 respectively. The two internal recesses 414 are matched with the two limit parts 47, which not only limit the function case 41 to move up and down, but also facilitate to quickly disassemble the function case 41. Further, at least one of the two limit parts 47 can be butted against the trigger handle 32 without exogenous process, thereby greatly lessening the impact of the trigger handle 32 on the function case 41 in the resetting process, and prolonging the service life of the function case 41.

Further, the flexible device 46 is formed integrally and includes a first sheathing portion 461 and a second sheathing portion 462 sheathed on the first connecting piece 42 and the second connecting piece 44 respectively, and an intermediate portion 463 connected between the first sheathing portion 461 and the second sheathing portion 462, the free end of the first sheathing portion 461 is butted against the front push rod lock 43, and the free end of the second sheathing portion 462 is butted against the rear push rod lock 45. The flexible device 46 here can be either a torsion spring with a circular cross section or a deformed spring sheet with a rectangular cross section. Compared with the structure in which the torsion springs are arranged in respect to the front push rod lock 43 and the rear push rod lock 45 respectively, the structure is simpler and its installment is simplified; moreover, the space is greatly saved to further reduce the volume of the sauce gun since the interference problem of the abutting portion among the two torsion springs and the function case 41 does not need to consider. In order to ensure the first sheathing portion 461 and the second sheathing portion 462 are butted against the front push rod lock 43 and the rear push rod lock 45 respectively in the working process of the flexible device 46 all the time, and to avoid the failure of the flexible device 46, the first sheathing portion 461 and the second sheathing portion 462 are provided with a hook-like portion 460 that is hooked on the front push rod lock 43 and the rear push rod lock 45 respectively.

Further, the first sliding groove 412 is a line groove, and the trigger handle 32 is provided with a U-shaped groove 321 matched with the first connecting piece 42. The structure is convenient for the user to dismantle the function case 41 from the cavity 311 in a condition that the trigger handle 32 is not dismantled; at the same time, as the first connecting piece 42 can move in the U-shaped groove 321, the trigger handle 32 drives the first connecting piece 42 to move up and down along the line groove when the trigger handle 32 is pulled, thereby driving the front push rod lock 43 to move the push rod 21 up and down; as the direction of moving the push rod by the front push rod lock 43 is consistent with the direction of the down-motion of the push rod 21, the design is more reasonable. The first sliding groove 412 is in a structure of an arc-shaped groove with respect to the hinge between the trigger handle 31 and the first connecting piece 42, the motion space is smaller, the mechanical property is better and the service life is longer.

Further, the lower end of the push rod 21 is detachably connected with a top tray 23. The sauce is convenient to squeeze out by the push rod 21 due to the top tray 23, without need to provide another push tray by the user, so it is convenient to use. The top tray 23 is detachably connected to the push rod 21, the lower end of the push rod 21 can be conveniently inserted into the function case 41 after dismantling the top tray 23 from the push rod 21 or the lower end of the push rod 21 is pulled away from the function case 41 by pulling the push rod 21 upward, so as to facilitate to replace the function case 41. The push rod here can not only be buckled with the top tray 23, but also be fixed with the top tray 23 through a fastening screw 230, without limit. When the top tray 23 is fixed with the push rod 21 by the fastening screw 30, a rotation-proof structure that prevents the top tray 23 from rotating with respect to the push rod 21 is arranged between the push rod 21 and the top tray 23; further, the rotation-proof structure includes a rotation-proof groove 231 with at least one straight flange arranged on the top tray 23, and the external wall at the lower end of the push rod 21 is fitted with the internal wall of the rotation-proof groove 231.

In order to make the flow rate of sauce squeezed out from the sauce gun controllable and adjustable, the first connecting piece 42 is provided with a projection 421 penetrating through the fixed handle 31, the fixed handle 31 is provided with a second sliding groove 312 for moving the first connecting piece 42 in a position corresponding to the first sliding groove 412, one side of the second sliding groove 312 is provided with a flow rate regulating device matched with the projection 421 for regulating the sliding displacement of the first connecting piece 42 in the second sliding groove 312, and the external wall of the fixed handle 31 is provided with an access groove 313 connected to the second sliding groove 312 and facilitating to install the projection 421 into the second sliding groove 312 from the opening end of the cavity 311. The flow rate regulating device controls the sliding displacement of the first connecting piece 42 in the second sliding groove 312, thereby further controls the rotation angle of the trigger handle 32 connected to the first connecting piece 42, and controls the down-motion displacement of the push rod 21 pushed by the front push rod lock 43 connected to the first connecting piece 42, so as to make the flow rate of sauce squeezed out every time controllable and adjustable.

According to the invention, when installing the function case 41, the U-shaped groove 321 of the trigger handle 32 is first aligned with the access groove 313 and then pushed into the function case 41 from the opening end of the cavity 311 far away from the opening end of the trigger handle, in the pushing-in process, the first connecting piece 42 enters into the access groove 313 and slides into the U-shaped groove 321 of the trigger handle 32, the function case 41 moves to the two internal recesses 414 under the guidance of the U-shaped groove 321 and is butted against the two limit members 47 respectively, and then the lower end of the push rod 21 penetrates through the fixed handle 31 and the function case 41 and goes through the through hole 11 in a condition that the row teeth 211 on the push rod 21 is staggered from the front push rod lock 43 and the rear push rod lock 45, and then the top tray 23 is installed at the lower end of the push rod 21, and finally the push rod 21 rotates until the front push rod lock 43 and the rear push rod lock 45 are blocked into the tooth groove of the row teeth 211. When dismantling the function case 41, the top tray 23 is firstly dismantled from the push rod 21, and then the push rod 21 rotates to stagger the row teeth 211 on the push rod 21 from the front push rod lock 43 and the rear push rod lock 45, and the push rod 21 is pulled out upward, the dismantled push rod 21 extends into the cavity 311 from the opening end of the cavity 311 close to the trigger handle 32 to support and push the function case 41, so that the function case is pushed out from the opening end of the cavity 311 far away from the trigger handle 32. According to the invention, it is simple and convenient to assemble and disassemble the function case 41, the force required is low, even if a female user can also operate freely.

The specific structure of the flow rate regulating device has several embodiments as below, but not limit to them.

Figure 7:
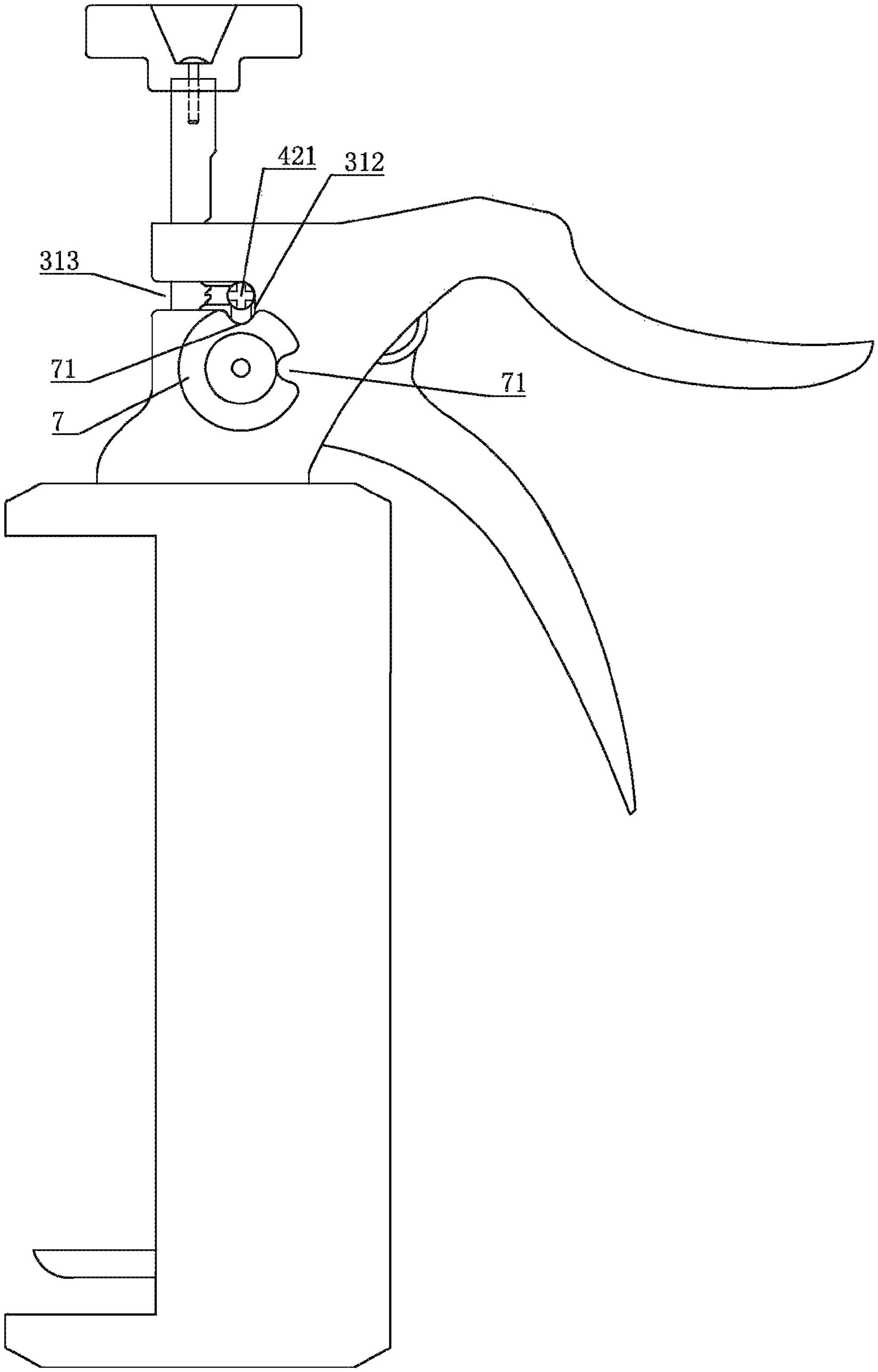
FIG. 7 is a front view of the embodiment 1 of the invention.

Embodiment 1: as specifically shown in FIG. 7, the flow rate regulating device includes a revolving member 7 rotatably connected to the fixed handle 31, and the revolving member 7 is provided with limit grooves 71 located at different depths and matched with the projection 421 in the circumferential direction. The sliding displacement of the first connecting piece 42 in the second sliding groove 312 is limited according to different depths of the limit groove 71, and the number of the limit grooves 71 can be provided according to the gears shifted as required. The structure is simple and it is convenient to manufacture.

Figure 8:
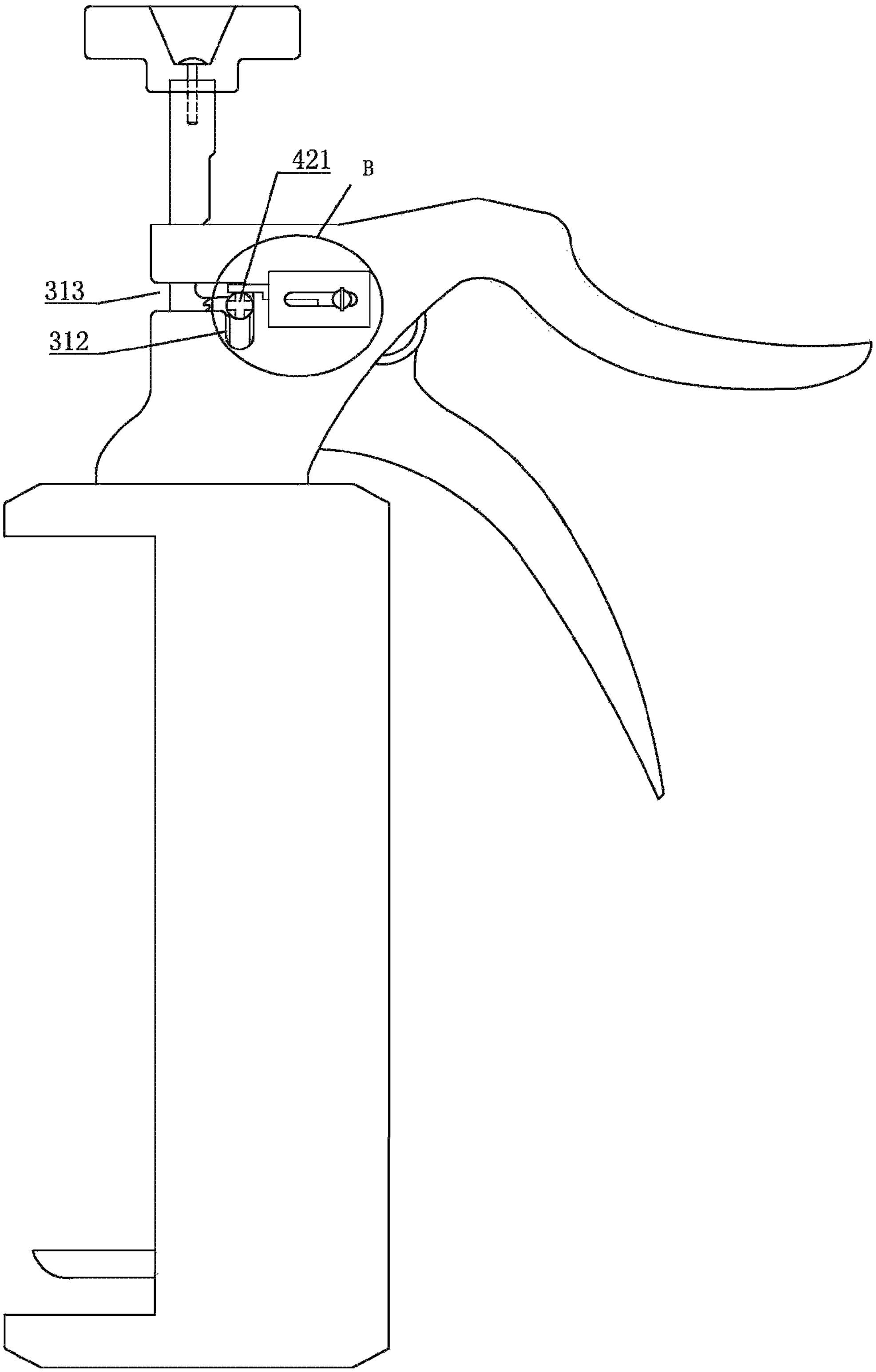
FIG. 8 is a front view of the embodiment 2 of the invention.
Figure 9:
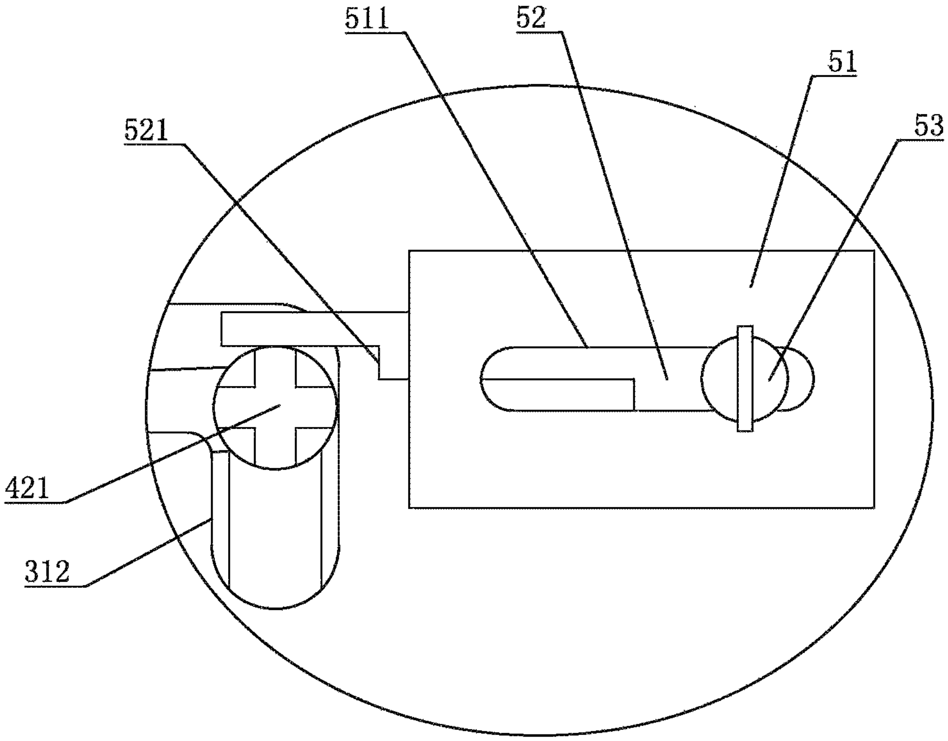
FIG. 9 is an enlarged view of portion B in FIG. 8.
Figure 10:
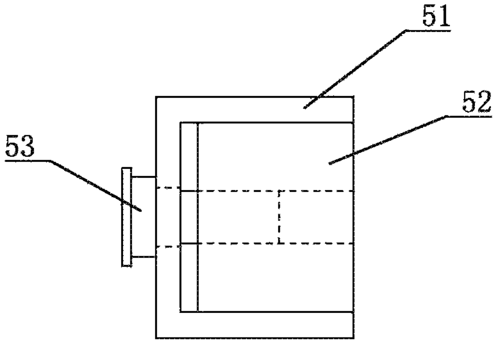
FIG. 10 is a side view of a flow rate regulating device in the embodiment 2 of the invention.

Embodiment 2: as specifically shown in FIG. 8 to FIG. 10, the differences from the embodiment 1 are that the flow rate regulating device includes a sliding seat 51 installed on the fixed handle 31 and a gear shifting member 52 slidably connected to the sliding seat 51, the side end of the gear shifting member 52 is screwed with a fastener 53 butted against the sliding seat 51 or the fixed handle 31 to fix the gear shifting member 53, one end of the gear shifting member 52 close to the second sliding groove 312 is provided with a step 521 matched with the projection 421. To be specific, the sliding seat 51 is internally provided with a first sliding cavity for installing the gear shifting member 52, the external wall of the sliding seat 51 is opened with a first movement hole 511 for movement of the fastener 53, the upper end of the fastener 53 is butted against the external wall of the sliding seat 51 to fix the gear shifting member 52, of course, the lower end of the fastener 53 can also be butted against the fixed handle 31 by penetrating through the gear shifting member 52 to fix the gear shifting member 52. When adjusting the flow rate of the sauce, the fastener 53 is loosened and then moves up and down, driving the gear shifting member 52 to move, so as to enable the different portions of the step 521 to extend across the second sliding groove 312. In this way, the sliding displacement of the projection 421, i.e., the first connecting piece 42 in the second sliding groove 312 is limited, and the fastener 53 is tightened after the first connecting piece 42 is adjusted to the preset position. The structure can achieve the gear shifting of the flow rate of sauce, and the number of the steps 521 can be provided according to the gear shifted as required.

In the embodiment, the gear shifting member 52 is arranged above the projection 421 to limit the up-motion of the first connecting piece 42; of course, the gear shifting member 52 can also be arranged below the projection 421 to limit the down-motion of the first connecting piece 42.

Figure 11:
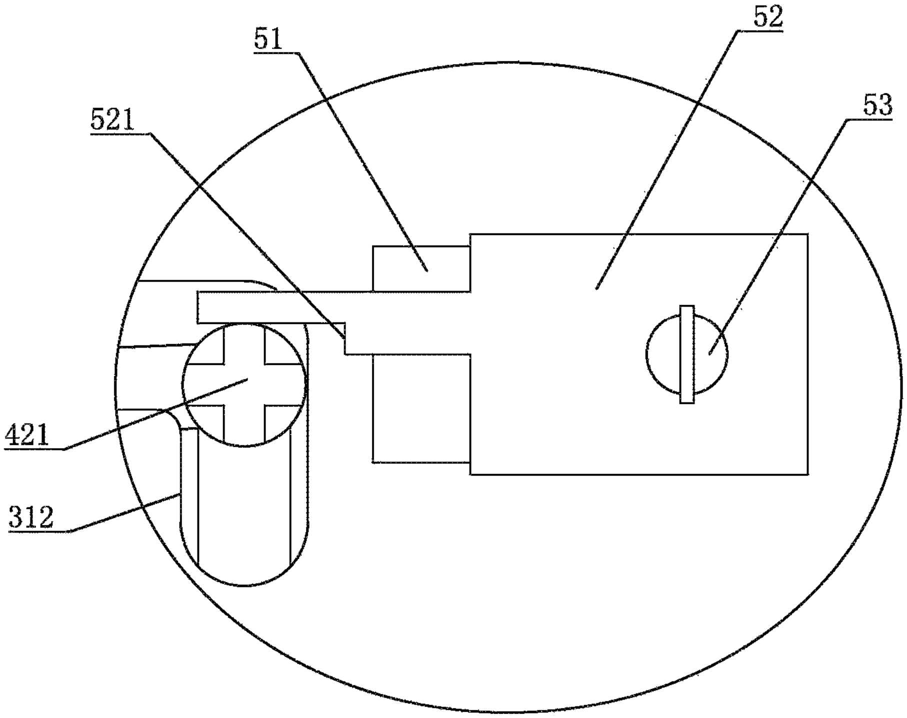
FIG. 11 is a local enlarged view of the embodiment 3 of the invention.
Figure 12:
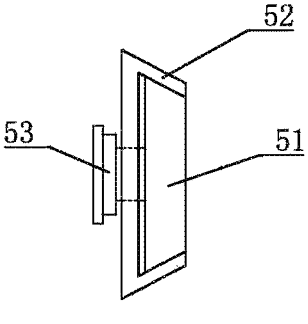
FIG. 12 is a side view of the flow rate regulating device in the embodiment 3 of the invention.

Embodiment 3: as specifically shown in FIG. 11 to FIG. 12, the flow rate regulating device includes a sliding seat 51 installed on the fixed handle 31 and a gear shifting member 52 slidably connected to the sliding seat 51, the side end of the gear shifting member 52 is screwed with a fastener 53 butted against the sliding seat 51 or the fixed handle 31 to fix the fastener 53 of the gear shifting member 52, one end of the gear shifting member 52 close to the second sliding groove 312 is provided with a step 521 matched with the projection 421.

The differences from the embodiment 2 are that the gear shifting member 52 is sheathed out of the sliding seat 51, the width of one end of the sliding seat 51 close to the fixed handle 31 is less than the width of one end of the sliding seat 51 far away from the fixed handle 31, so as to prevent the gear shifting member 52 from falling from the sliding seat 51. In the specific embodiment, the cross section of the sliding seat 51 is in a shape of trapezoid.

In the embodiment, the gear shifting member 52 is arranged above the projection 421 to limit the up-motion of the first connecting piece 42; of course, the gear shifting member 52 can also be arranged below the projection 421 to limit the down-motion of the first connecting piece 42.

Figure 13:
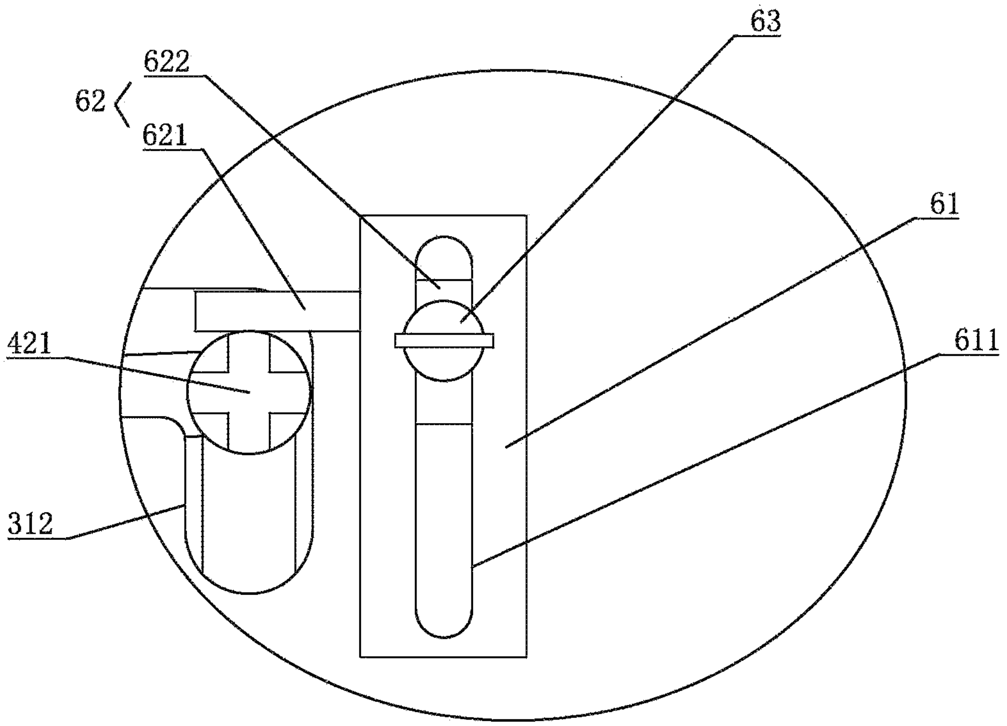
FIG. 13 is a local enlarged view of the embodiment 4 of the invention.
Figure 14:
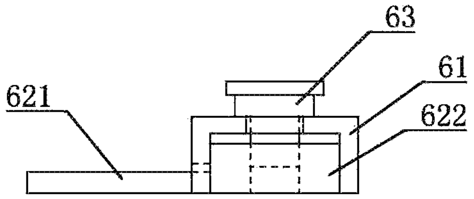
FIG. 14 is a top view of the flow rate regulating device in the embodiment 4 of the invention.

Embodiment 4: as specifically shown in FIG. 13 and FIG. 14, the flow rate regulating device includes a fixed seat 61 arranged on the fixed handle 31 and a continuous shifting member 62 movably connecting to the fixed seat 61, the continuous shifting member 62 includes a blocking arm 621 matched with the projection 421 and a guiding portion 622 slidably matched with the fixed seat 61*y*, and the guiding portion 622 is screwed with a locking member 63 butted against the fixed seat 61 or the fixed handle 31 to fix the continuous fixing member 62. To be specific, the fixed seat 61 is internally provided with a second sliding cavity for installing the guiding portion 622, the external wall of the fixed seat 61 is provided with a blocking arm hole for the blocking arm 621 extending out and moving, and a second movement hole 611 for movement of the locking member 63, the upper end of the locking member 63 is butted against the external wall of the fixed seat 61 to fix the continuous shifting member 62, of course, the lower end of the locking member 63 can also be butted against the fixed handle 31 by penetrating through the continuous shifting member 62 to fix the gear shifting member 52. When adjusting the flow rate of the sauce, the locking member 63 is loosened and then moves up and down, driving the continuous shifting member 62 to move up and down, so as to enable the blocking arm 621 to locate at different positions of the second sliding groove 312 in the length direction. The sliding displacement of the first connecting piece 42 in the second sliding groove 312 is limited by the blockage of the blocking arm 621 to the projection 421, and then the locking member 63 is tightened after adjusting the first connecting piece 42 to the position as required. Compared with the embodiment 1 to the embodiment 3, the flow rate of sauce can be adjusted at will, so the structure is convenient to use.

Figure 15:
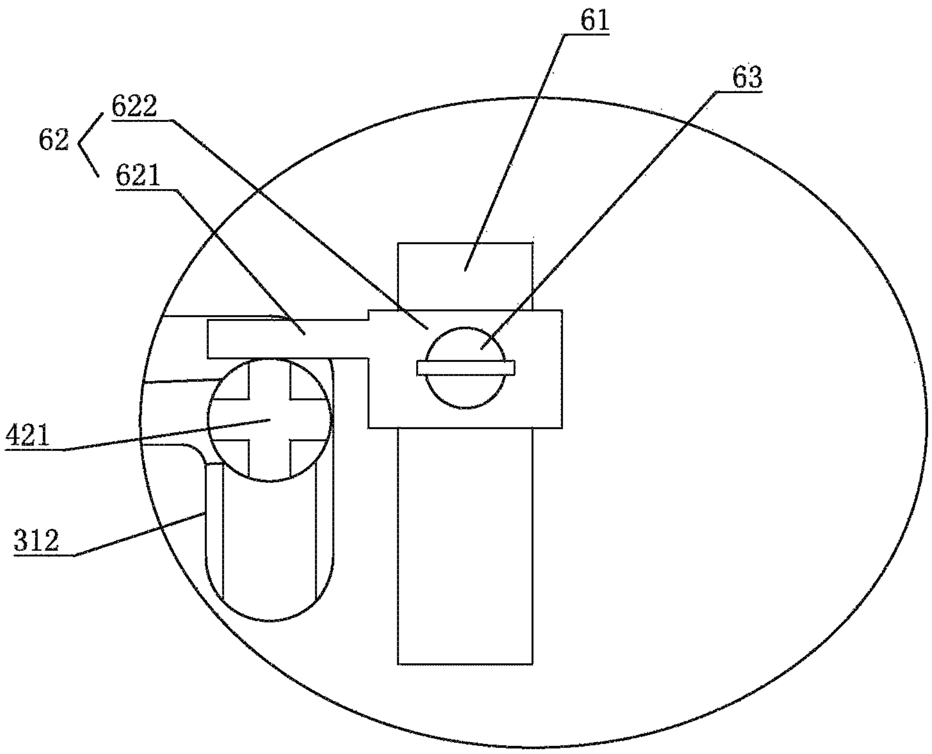
FIG. 15 is a local enlarged view of the embodiment 5 of the invention.
Figure 16:
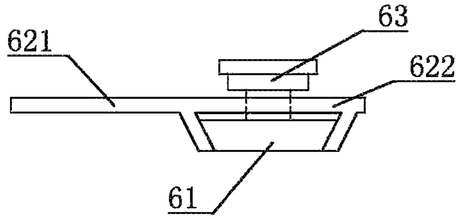
FIG. 16 is a top view of the flow rate regulating device in the embodiment 5 of the invention.

Embodiment 5: as specifically shown in FIG. 15 and FIG. 16, the flow rate regulating device includes a fixed seat 61 arranged on the fixed handle 31 and a continuous regulating member 62 movably connecting to the fixed seat 61, the continuous regulating member 62 includes a blocking arm 621 matched with the projection 421 and a guiding portion 622 slidably matched with the fixed seat 61, and the guiding portion 622 is screwed with a locking member 63 butted against the fixed seat 61 or the fixed handle 31 to fix the continuous fixing member 62.

The differences from the embodiment 4 are that the continuous shifting member 62 is sheathed out of the fixed seat 61, the width of one end of the fixed seat 61 close to the fixed handle 31 is less than the width of one end of the fixed seat 61 far away from the fixed handle 31, so as to prevent the continuous shifting member 62 from falling from the fixed seat 61. In the specific embodiment, the cross section of the fixed seat 61 is in a shape of trapezoid. Compared with the embodiment 1 to the embodiment 3, the flow rate of sauce can be adjusted at will, so the structure is convenient to use.

It is certainly that the invention may have other structural deformations excluding the above embodiments, and these equivalent technical solutions shall also fall within the protection scope of the invention.

What is claimed is:

1. A sauce gun with replaceable pushing mechanism, comprising a gun body (1), wherein the upper end of the gun body is provided with a through hole (11);

a push rod (21), wherein the push rod movably installed in the through hole (11) in an up-and-down motion, and the push rod (21) is provided with row teeth (211);

a fixed handle (31), wherein the fixed handle is fixedly installed at the top of the gun body (1) and internally provided with a cavity (311) with openings at both ends;

a trigger handle (32), wherein one end of the trigger handle extends into the cavity (311) and then is hinged with the fixed handle (31); and a pushing mechanism, wherein the pushing mechanism comprises a function case (41) detachably installed in the cavity (311), the trigger handle (32) is installed out of the function case (41), the function case (41) is provided with a push rod through hole (411) facilitating the push rod (21) to penetrate through corresponding to the through hole (11) of the gun body (1), the external wall of the function case (41) is provided with a first sliding groove (412), the first sliding groove (412) is internally provided with a first connecting piece (42) driven by the trigger handle (32), and the function case (41) is internally provided with a front push rod lock (43) rotatably connected to the first connecting piece (42), a rear push rod lock (45) hinged with the function case (41) through a second connecting piece (44), and a flexible device (46) driving the front push rod lock (43) and the rear push rod lock (45) to match with the row teeth (211) respectively.

2. The sauce gun with replaceable pushing mechanism according to claim 1, wherein one end of the function case (41) far away from the trigger handle (32) is provided with a case opening (413) aligning with the opening of the cavity (311), the push rod (21) blocks and seals the case opening (413) and forms an enclosure space with the external wall of the function case (41), and the front push rod lock (43), the rear push rod lock (45) and the flexible device (46) are installed in the enclosure space.

3. The sauce gun with replaceable pushing mechanism according to claim 1, wherein the external wall of the function case (41) is provided with two internal recesses (414), the opening of each internal recess (414) faces toward the opening of the cavity (311) and is close to the trigger handle (32), and the fixed handle (31) is provided with two limit parts (47) located at different altitudes and matched with the two internal recesses (414) respectively.

4. The sauce gun with replaceable pushing mechanism according to claim 1, wherein the flexible device (46) is formed integrally and comprises a first sheathing portion (461) and a second sheathing portion (462) sheathed on the first connecting piece (42) and the second connecting piece (44) respectively, and an intermediate portion (463) connected between the first sheathing portion (461) and the second sheathing portion (462), the free end of the first sheathing portion (461) is butted against the front push rod lock (43), and the free end of the second sheathing portion (462) is butted against the rear push rod lock (45).

5. The sauce gun with replaceable pushing mechanism according to claim 1, wherein the first sliding groove (412) is a line groove, and the trigger handle (32) is provided with a U-shaped groove (321) matched with the first connecting piece (42).

6. The sauce gun with replaceable pushing mechanism according to claim 1, wherein the first connecting piece (42) is provided with a projection (421) penetrating through the fixed handle (31), the fixed handle (31) is provided with a second sliding groove (312) for movement of the first connecting piece (42) in a position corresponding to the first sliding groove (412), one side of the second sliding groove (312) is provided with a flow rate regulating device matched with the projection (421) for regulating the sliding displacement of the first connecting piece (42) in the second sliding groove (312), and the external wall of the fixed handle (31) is provided with an access groove (313) connected to the second sliding groove (312) and facilitating to install the projection (421) into the second sliding groove (312) from the opening end of the cavity (311).

7. The sauce gun with replaceable pushing mechanism according to claim 6, wherein the flow rate regulating device comprises a revolving member (7) rotatably connected to the fixed handle (31), and the revolving member (7) is provided with limit grooves (71) located at different depths and matched with the projection (421) in a circumferential direction.

8. The sauce gun with replaceable pushing mechanism according to claim 6, wherein the flow rate regulating device comprises a sliding seat (51) installed on the fixed handle (31) and a gear shifting member (52) slidably connected to the sliding seat (51), the side end of the gear shifting member (52) is screwed with a fastener (53) butted against the sliding seat (51) or the fixed handle (31) to fix the gear shifting member (53), one end of the gear shifting member (52) close to the second sliding groove (312) is provided with a step (521) matched with the projection (421).

9. The sauce gun with replaceable pushing mechanism according to claim 1, wherein the lower end of the push rod (21) is detachably connected with a top tray (23).

10. The sauce gun with replaceable pushing mechanism according to claim 1, wherein the push rod (21) is a round rod.

* * * * *